(12) United States Patent
Krishnamurthy et al.

(10) Patent No.: US 8,806,269 B2
(45) Date of Patent: Aug. 12, 2014

(54) UNIFIED, WORKLOAD-OPTIMIZED, ADAPTIVE RAS FOR HYBRID SYSTEMS

(75) Inventors: Rajaram B. Krishnamurthy, Wappingers Falls, NY (US); Carl J. Parris, Rhinebeck, NY (US); Donald W. Schmidt, Stone Ridge, NY (US); Benjamin P. Segal, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 13/170,590

(22) Filed: Jun. 28, 2011

(65) Prior Publication Data

US 2013/0007412 A1    Jan. 3, 2013

(51) Int. Cl.
*G06F 11/00* (2006.01)
(52) U.S. Cl.
USPC ............................................................ 714/11
(58) Field of Classification Search
None
See application file for complete search history.

(56) References Cited

U.S. PATENT DOCUMENTS

| | | | |
|---|---|---|---|
| 6,615,366 B1 * | 9/2003 | Grochowski et al. | 714/10 |
| 7,308,566 B2 * | 12/2007 | Michaelis et al. | 713/1 |
| 7,979,746 B2 * | 7/2011 | Cornelius et al. | 714/37 |
| 2006/0117300 A1 | 6/2006 | Puthukattukaran et al. | 717/124 |
| 2008/0109642 A1 * | 5/2008 | Beutler et al. | 712/225 |
| 2008/0244354 A1 * | 10/2008 | Wu et al. | 714/755 |
| 2013/0061086 A1 * | 3/2013 | Baba | 714/3 |

OTHER PUBLICATIONS

Khronos Group, The OpenCL Specification, Version 1.0, Oct. 6, 2009, pp. 1, 11, 12.

* cited by examiner

*Primary Examiner* — Michael Maskulinski
(74) *Attorney, Agent, or Firm* — Steven Chiu; Ido Tuchman

(57) ABSTRACT

A method, system, and computer program product for maintaining reliability in a computer system. In an example embodiment, the method includes managing workloads on a first processor with a first processor architecture by an agent process executing on a second processor with a second processor architecture. The method proceeds by activating redundant computation on the second processor by the agent process. The method continues by performing a same computation from a workload of the workloads at least twice. Finally, the method includes comparing results of the same computation. In this embodiment the first processor is coupled the second processor by a network, and the first processor architecture and second processor architecture are different architectures.

18 Claims, 14 Drawing Sheets

UNIFIED, WORKLOAD-OPTIMIZED, ADAPTIVE RAS FOR HYBRID SYSTEMS

BACKGROUND

The present invention is directed to the field of computer systems, and more specifically to a unified, workload-optimized, adaptive Reliability, Availability, and Serviceability (RAS) for hybrid systems.

Hybrid systems are heterogeneous computing environments and may include a combination of servers with different architectures or instruction sets. Some of these servers may be highly reliable, such as the IBM System z and other mainframe systems. Other components of a hybrid system may include commodity attachments such as appliances, blades such as x86, and accelerators such as graphical processing units (GPUs) and FPGAs (Field Programmable Gate Arrays). These commodity attachments may have a lower Reliability, Availability, and Serviceability (RAS) than high-end mainframe systems.

Assume a system of systems with System A and System B. Let R denote a reliability function relating to the probability that an entity will not fail at time t given that it did not fail at time t=0. Assume $R(A)>R(B)$. For a workload executing on this system of systems, the effective reliability is the product $R(A) \times R(B)$. If $R(A)$ is 0.8 and $R(B)$ is 0.1 then the effective reliability is $R(A) \times R(B)$ or 0.08. This value is lower than $R(B)$. Thus, the effective reliability is lower then the weakest link in the chain.

SUMMARY

An example embodiment of the present invention is a system for processing data in a computer system. The system includes a first processor, a first memory coupled to the first processor, a network link coupled to the first processor, a second processor coupled to the first processor through the network link, and a second memory coupled to the second processor. The second memory includes computer readable program code embodied on it which is configured to: set a flag for redundancy checking of a computation in the second memory, where the redundancy checking performs the computation at least twice and compares results of each computation. The computer readable program code is also configured to command an agent process executing on the first processor to perform redundancy checking when running the computation on the first processor based on a state of the flag.

Another embodiment of the invention is a method for processing data in a computer system. The method includes managing workloads on a first processor with a first processor architecture by an agent process executing on a second processor with a second processor architecture. The method further includes activating redundant computation on the second processor by the agent process. The method also includes performing a same computation from a workload of the workloads at least twice. The method includes comparing results of the same computation. In this embodiment, the first processor is coupled the second processor by a network, and the first processor architecture and second processor architecture are different architectures.

A further embodiment of the invention is a computer program product for maintaining reliability in a computer system configuration. The computer program product includes a computer readable storage medium having computer readable program code embodied on it. The computer readable program code is configured to manage workloads on a first processor with a first processor architecture by an agent process executing on a second processor with a second processor architecture. The computer readable program code is further configured to activate redundant computation on the second processor by the agent process. The computer readable program code is also configured to perform a same computation from a workload of the workloads at least twice. The computer readable program code is further configured to compare results of the same computation. In this embodiment the first processor is coupled the second processor by a network and the first processor architecture and second processor architecture are different architectures.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION

Figure 1:
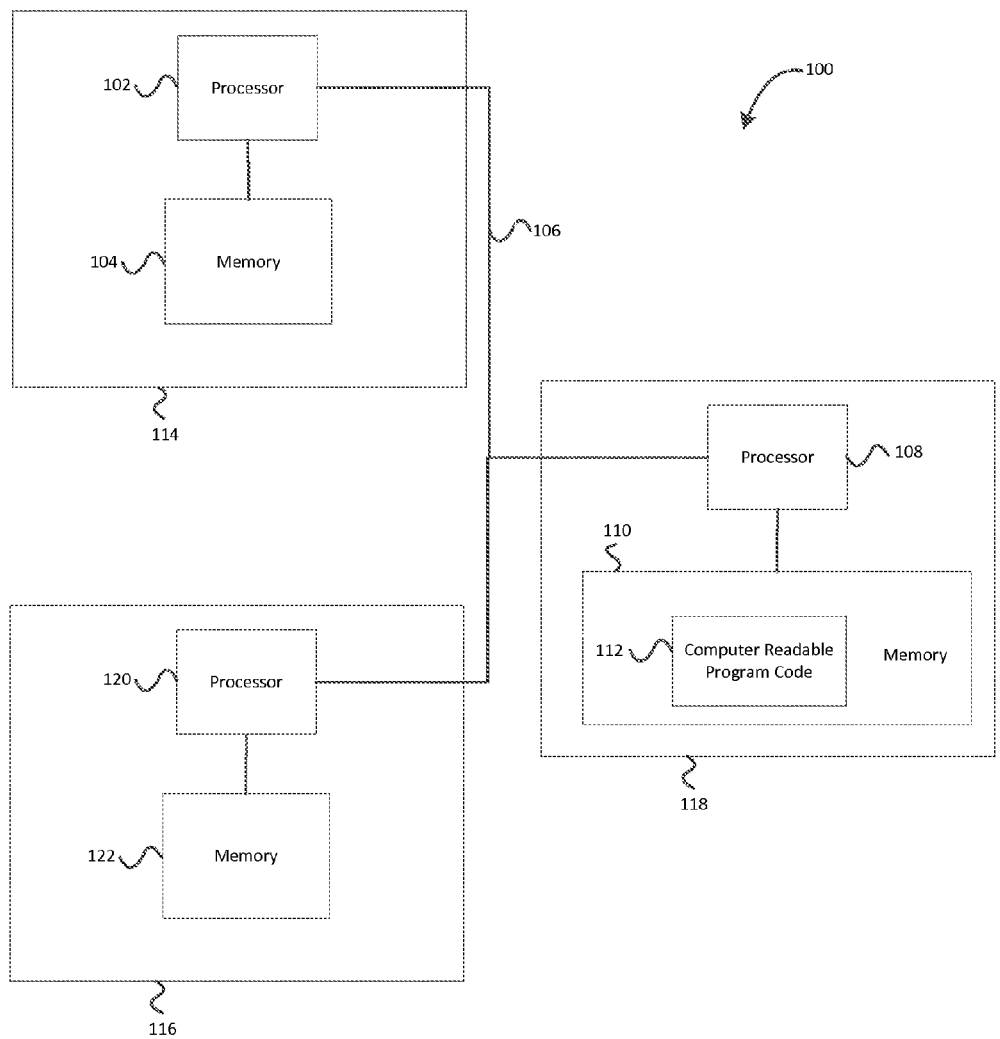
FIG. 1 illustrates an example system for maintaining reliability.

Existing systems do not tackle the problem that the effective reliability of a hybrid system can be equal to or lower than the weakest link in the chain of systems. This is because the connected systems tend to be the same. Such systems, for example, may include two or more x86 computers. In the case of an IBM System z attached to an accelerator (of unknown FIT characterization), there can be two to three orders of magnitude difference in failures in time (FIT) rate of undetected errors between the IBM System z and the attached accelerator. Also it is common practice in computing environments to use commodity network interface adapters and switches to interconnect multiple computers. These components could also affect the effective reliability of the combined 'system of systems'.

Reliability, Availability, and Serviceability (RAS) are important in computing environments. Reliability may be described as decreasing the effects of hard and soft errors in the computing environment. The approach to reliability can be in two areas: computation on the processor and data that flows over the network. Hard errors may include permanent errors, including malfunctions in the hardware itself. These include a processor failure or a network adapter failure requiring replacement or activation of a standby component. Soft errors, on the other hand, are transient errors that are not permanent and may include a bit flip caused by cosmic rays or alpha particles that strike silicon atoms on the surface of a chip. Applications may be influenced by a change in values due to hard and soft errors and mitigation is needed. One of the approaches of the invention is using redundancy, which is performing an operation multiple times and then verifying it, which allows a user to trust that the hardware is providing correct results. A common way to provide redundancy is to provide lock-step operation between two processors using hardware mechanisms. Such schemes may operate at a cycle-by-cycle basis and may constrain the throughput of a computation. For a unified RAS across a 'system of systems', the idea is to provide redundancy in data flows between the accelerator and System z both for computation and the interconnection network. This will allow the effective reliability of the hybrid system consisting of the accelerator and System z to be close to the reliability of a standalone System z.

Embodiments of the invention apply to commodity and enterprise accelerators. Commodity accelerators are accelerators whose FIT rates have not been characterized (i.e. are unknown during the time of use). Enterprise accelerators are accelerators with known, characterized FIT rates. This specification uses the terms blade and accelerator interchangeably and may refer to both commodity and enterprise accelerators and blades. Main server, mainframe, mainframe server, and server are also used interchangeably to refer to the main server in the hybrid system. Embodiments of the invention also apply to "open" and "closed" configurations. Embodiments of the invention allow multiple modular redundancy schemes to be applied on a workload basis. Hybrid software allows scaling from dual modular redundancy, triple modular redundancy to schemes beyond.

In the closed configuration, embodiments of the invention use a primary path and multiple shadow paths between System A and System B (main system A and accelerator B). This may be dependent on n-modular redundancy. For example, in a triple modular redundancy scheme, data can pass through 3 separate independent paths from A to B. All these input paths can be checked at B. The data can be computed on three independent accelerators on B. The output data can be checked in two ways (i) on the accelerator system B or (i) when the data is passed back to A. For floating point codes, the output at B can be non-repeatable. For such cases, the output may be checked using multiple voters on B within a given tolerance. As a second stage, the outputs are checked on A. For integer computation, the first stage on accelerators B can be avoided. For commodity accelerators, N-modular redundancy compute units are used along with N-modular interconnect links. For enterprise accelerators with compute units of B with similar R functions as A, one B compute unit may be used while N-modular-redundancy links are used.

In the Open Configuration, the input stream is broadcast along N-modular links using a switch that supports port mirroring. A commodity accelerator using N-modular voters in two stages-one on the accelerator and the second on the main server. In this case, data is received on the accelerator and then relayed to the main server. For an enterprise accelerator, a single input link may be used. After computation on a single compute unit, the result may be transmitted along N-modular paths and checked on System A. In open mode, for streaming data, a window may be maintained on the input. For data on the main server received in error, input data on the accelerator can be re-executed depending on real-time constraints of the stream. If this is not possible, the data may be dropped. Both go-back-N and selective retransmission schemes can be used depending on the situation.

Embodiments of this invention allow different options for a user depending on performance and budget constraints. Aspects of the invention are workload optimized because a user can use different physically distinct blades or physically distinct cores when redundant computation is required for hard and soft errors. Alternatively, a single core may be used for serial execution of a redundant computation when only soft errors are of concern. Aspects of the invention also relate to a unified system because there is a tendency to look at components in a piece meal manner but here a user can see embodiments of the invention as a single system when it is in fact a heterogeneous system.

The present invention is described with reference to embodiments of the invention. Throughout the description of the invention reference is made to FIGS. 1-10. It is noted that the configurations and ordering shown is just one example of various arrangements of the present invention and should not be interpreted as limiting the invention to any particular configuration.

FIG. 1 illustrates an example system for maintaining reliability. The system 100 may include a single accelerator or a set of commodity or enterprise accelerators 114 and 116 and a server 118. The accelerator 114 may include a first processor 102 and a first memory 104 coupled to the first processor 102.

A network link 106 can also be coupled to the first processor 102. The network link 106 may be an InfiniBand or Ethernet connection. It can also be a PCI-express bus segment. Also attached to the network link 106 can be a second processor 108 which may be coupled to the first processor 102 through the network link 106. A second memory 110 may be coupled to the second processor 108. The server 118 may include the second memory 110 and the second processor 108.

In further embodiments of the invention additional processors may be attached by a network link 106 to the second processor 108. Some embodiments of the invention, in an open mode, processor 102 may be connected by a network to external resources in addition to being connected to the second processor 108. Other embodiments of the invention could operate in a closed mode where the processor 102 is only connected to other processors in the system 100 such as the second processor 108.

In certain embodiments of the invention, the second processor 108 will be attached to multiple processors 102, 120 and each processor 102, 120 may include its own memory 104, 122. The processors 102, 120 may be coupled by network link 106.

The second memory 110 may have computer readable program code 112 embodied on it. The computer readable program code 112 may be configured to perform various tasks for the system 100. One such task may include managing the workloads on the system 100 through the use of an agent process working on an accelerator 114, 116. This may be accomplished using the Open Computing Language (OpenCL) runtime. The OpenCL runtime is a software library and associated resources that allow an address space to launch OpenCL programs and call OpenCL kernels on attached accelerators. Another task may include setting a flag for a computation for redundancy checking in the second memory 110, where the redundancy checking performs the computation at least twice and compares results of each computation. This may further include commanding an agent process executing on the first processor 102 to perform redundancy checking when running the computation on the first processor 102 based on the state of the flag. The flag may be set dynamically based on policy information.

In an embodiment of the present invention, the network link 106 includes a data path and a control path. In this embodiment, the system 100 is configured to compute a first checksum by the first processor 102 based on data received on the data path and compare the checksum with a second checksum computed by the second processor 108, received on the control path.

Figure 9:
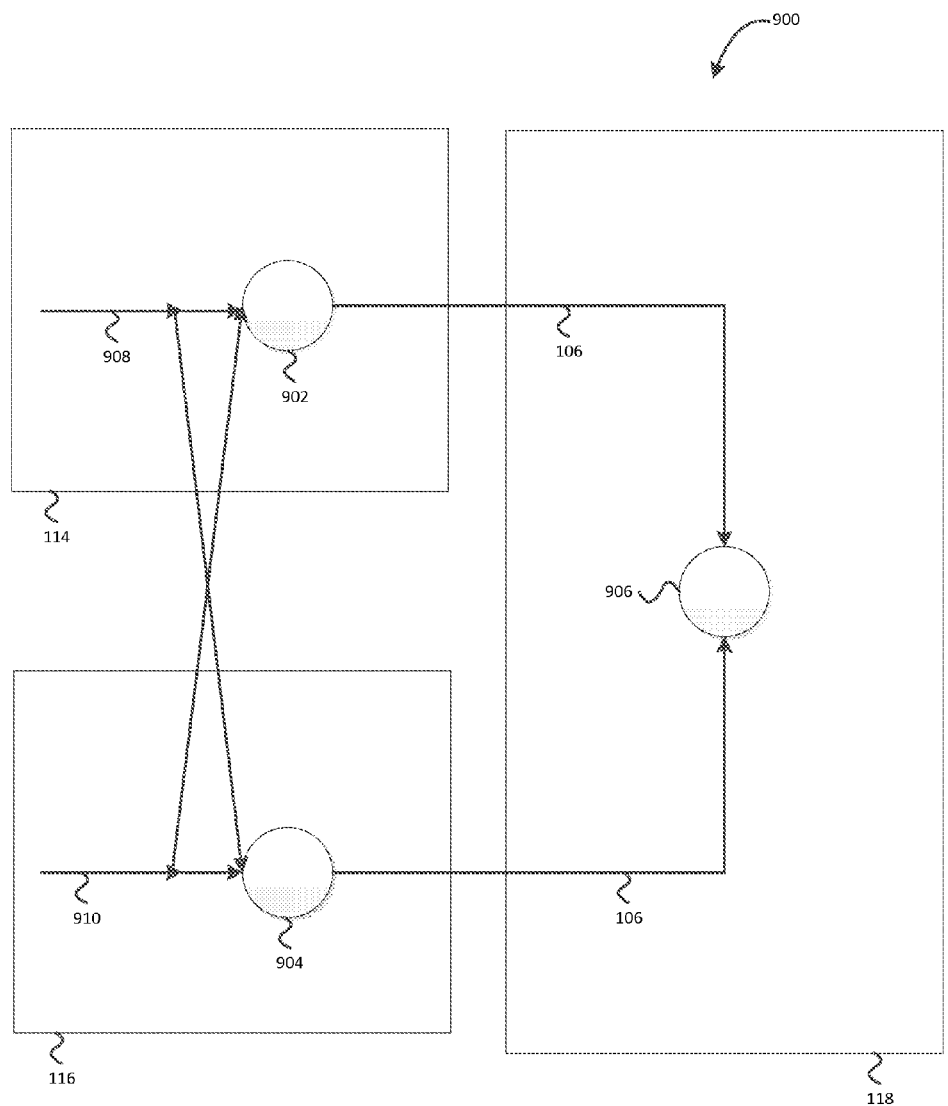
FIG. 9 illustrates an example use of an approximate comparator in a system for maintaining reliability.

In certain embodiments, a Hardware Management Console (HMC) is used when checking is to be used for a particular computation. The HMC may embed a Quality of Service (QoS) flag in the Platform Management Process (PMP) table with a Job Identifier (JobID). The PMP process can monitor and manage resources and performance for the System z platform and the attached accelerators. This can be done on a workload basis because each workload can have a JobID. When the OpenCL runtime comes up during address space activation, it may query the PMP process with the name of the JobID and the PMP process returns whether checking is wanted or not based on the value of the QoS flag and the runtime then activates the agent process on the blade 114 that it wants redundant computation depending on the value of the flag. For example, a value of QoS flag as '1' means that redundant computation is required while a value of '0' means that redundant computation is not required. In a yet another embodiment, accelerators can be configured using firmware into a multitude of device types. A device type A may use a single accelerator blade with primary and replicas computed concurrently on multiple cores on the same chip or "die". A device type B may use a single accelerator blade with primary and replicas computed concurrently on multiple cores across multiple "dies" or chips. A device type C may use a single accelerator blade with primary and replica computation computed serially on a single core. Device types D, E and F may be constructed similar to A, B and C but with multiple accelerator blades to implement N-modular redundancy. It will be understood that the aggregate collection of blades is presented to System z workload management software as a single unit. Also, device types may be converted into other device types under the control of firmware. For example, a device with two blades with primary and replica computation on each blade and using a comparator setup as shown in FIG. 9 may be transformed into two single blade devices with primary and replica computation staged on the same device. The ability to define device types allows a system designer to choose the level of reliability required by trading off resource usage (number of blades) and cost. When the OpenCL runtime comes up during address space activation, it may query the PMP process with its JobID and RACF credentials. The PMP process may store a table with Job ID, Resilience Definition and Device Name. This table may be populated by external workload management processes or the Resource Access Control Facility (RACF) process agents. Resilience definition is a field that describes whether checking is required or not along with physical redundancy needs (single or multiple accelerators). The PMP process may use a distributed workload manager (DWLM) to determine where accelerator work from the OpenCL address space needs to be scheduled. Once the device name is determined, the table inside the PMP may be populated. The device name is communicated back to the OpenCL address space and the OpenCL address space may then schedule computation on the device.

In an embodiment of the present invention, the OpenCL runtime may allow the mainframe 118 to call the accelerator 114 and the accelerator 114 runs OpenCL kernels. The server 118 passes data to these kernels on the accelerator 114. The accelerator 114 may execute the OpenCL kernels in redundant fashion. A primary kernel and replica kernel may be executed and their results compared on the accelerator agent. Multiple replicas may be executed depending on the choice of n-modular redundancy policies. If the results agree, the answer may be sent back to the server 118. If the results do not agree, appropriate action may be taken dependent on a higher level policy, not limited to checkstopping the accelerator with logging and repeating the computation. The agent running on the blade 114 can be responsible for starting primary and replica computation and checking their results. Data Communication and Synchronization Libraries (DaCS) may allow OpenCL to call the kernel running on the accelerator 114.

In a further embodiment, a runtime application runs on the server 118 and on the blade 114. There may be a control path from a daemon running on the server 118 to a daemon running on the blade 114. The runtime can send data to make a call to the OpenCL kernel on the blade 114 that returns an answer to server 118. When the blade 114 is called, it may be sent buffer objects. The first task that can be done may be checksum computation (on the data in the buffer objects) which may be sent over control channels as metadata and the objects may then be sent separately along a separate data path. When the buffer objects reach the other side, the checksum can be recalculated and then matched with the checksum on the receive buffer, coming in through the control path. Data may be sent from the server 118 to the blade 114 so data may be checked for bit flips. The checksum data may then be sent along the control path or along the separate data path. The control path and data path could be along separate physical links. In an alternate embodiment, there is a single link instead of separate data and control paths. This could be achieved with virtual channels or sending one set of data before the other. It will be understood that the strength of the checksum may be varied depending on processing capabilities at the sender and receiver.

In a further embodiment there is a Remote Direct Memory Access (RDMA) mechanism for moving data. Control data may be sent from the main server 118 over to the blade 114 that has RDMA tokens and can have the checksum of the data as well. Based on the RDMA token, the blade 114 can make a RDMA read request over to the server 118 and read that data. Once the data is transferred, the checksum may be verified. Alternatively, the blade may request the data twice (or multiple times to implement n-modular redundancy) and verify the data returned on the blade.

In an embodiment of the current invention, the server 118 has a Service Level Agreement (SLA) that specifies the reliability on which the system 100 has to operate. One aspect of the embodiment is providing a scale for reliability. For instance, there could be multiple grades of reliability a high, a medium, and a low reliability grade. Resources could be configured to meet that level of reliability. There could be end-to-end checking for communication between the main server 118 and accelerators 114, 116 in high reliability mode along with checking for computation. In medium reliability modes, the system 100 might not do all the checking to avoid spending resources and execution time. In low reliability mode, for instance with unneeded or advisory data, checking may not be done on the computation or the network. The user may have the ability to choose the level or reliability that is needed for the application and the resources will be used in such a manner to satisfy the SLA whether it is low, medium, or high.

Figure 2:
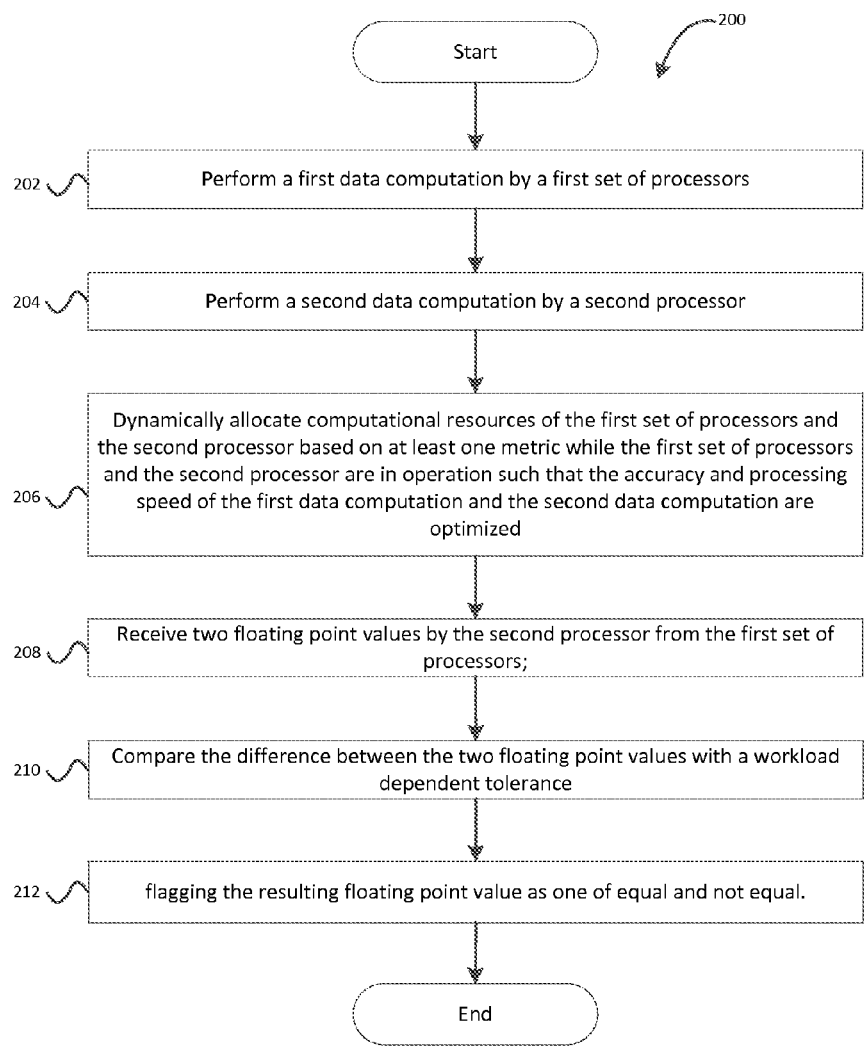
FIG. 2 is a flowchart illustrating an example method for processing data in a computer system, as contemplated by the present invention.

FIG. 2 is a flowchart illustrating an example method for processing data in a computer system, as contemplated by the present invention.

An embodiment of the method for processing data in a computer system 200 may include performing, at block 202, a first data computation by a first set of processors 102, 120, the first set of processors having a first computer processor architecture 114, 116. The method can continue by performing a second data computation by a second processor 108, at block 204, coupled to the first set of processors 102, 120. The second processor 108 may have a second computer processor architecture 118. The first computer processor architecture 114, 116 may be different than the second computer processor architecture 118.

The method may further include dynamically allocating computational resources, at block 206, of the first set of processors 102, 120 and the second processor 108 based on at least one metric while the first set of processors 102, 120 and the second processor 108 are in operation such that the accuracy and processing speed of the first data computation and the second data computation are optimized. The metric may include computational speed of the first data computation and the second data computation, the availability of processor cycles to perform redundant calculations in a given time period, the type of data being processed, or a combination of metrics.

In embodiments of the present invention, dynamically allocating computational resources includes adjusting an amount of computational redundancy for the first data computation by the first set of processors 102, 120. Redundant computation can involve computing a replica of the primary computation. Computation checking may involve a comparison of primary and replica computation. In other embodiments dynamically allocating computational resources includes changing computation from concurrent redundant computation of the data by the first set of processors 102, 120 to serial redundant computation (and vice-versa) of the data by the first set of processors 102, 120 based on performance and availability of processor cycles to perform redundant calculations in a given time period.

In a further embodiment, a hardware processor subsystem provides processor lock-stepping, computation on a processor may be computed on its shadow using cycle-by-cycle lockstepping. In an even further embodiment, software must only be cognizant of running a primary computation with lockstepping being handled by the processor complex 'under the covers'. Such a choice may entail performance tradeoffs and may require balancing associated with cycle-by-cycle lockstepping. Such balancing may require the need to choose between redundancy computation using processor lockstepping, concurrent primary and replica(s) computation or serialized primary and replica(s) computation since each choice is governed by different set of resource usage needs. In further embodiments, allocating computing resources includes balancing computation and bandwidth dynamically based on performance and availability of processor cycles to perform redundant calculations in a given time period.

Further embodiments of the present invention include an approximate comparator. This may include receiving two floating point values by the second processor 108 from the first set of processors 102, 120, at block 208. The floating point values may be transmitted over network link 106. Then, the method 200 may continue comparing the difference, at block 210, between the two floating point values with a workload dependent tolerance. The workload dependent tolerance may be an upper bound of a relative error in a calculation and may be represented by epsilon ($\epsilon$). Additional embodiments include flagging the resulting floating point value as one of equal and not equal, at block 212. For example, a floating point value is redundantly generated in a first accelerator 114 with a value O1 and in a second accelerator 116 with a value O2. The values are received on the second processor 108 where they are compared against using an approximate comparator with workload dependent tolerance $\epsilon$. If the absolute value of $(O1-O2) < \epsilon$ then the values can be flagged "equal" or "almost equal"; otherwise the values can be flagged "not equal." If the value of $\epsilon$ is 0 then the approximate comparator becomes a regular comparator.

FIG. 9 illustrates an example use of an approximate comparator in a system for maintaining reliability. An embodiment of the invention, the system 900 has an approximate comparator on each accelerator 114, 116, and after computing a result on each accelerator 114, 116 cross link the inputs 908, 910 to the approximate comparator 902, 904 to the other accelerator 116, 114 so each accelerator 114, 116 performs the comparison. The result of the approximate comparators ("equal" or "unequal") can be sent to the mainframe server 118 and compared at comparator 906. In an embodiment without cross linking, the values can be sent to the mainframe server 118 and the floating point comparison can occur there. Depending on where the checking is done, processor time may be freed on the mainframe server or on an accelerator. This also allows mainframe servers and accelerators of different precision capabilities to compare results values.

Figure 10:
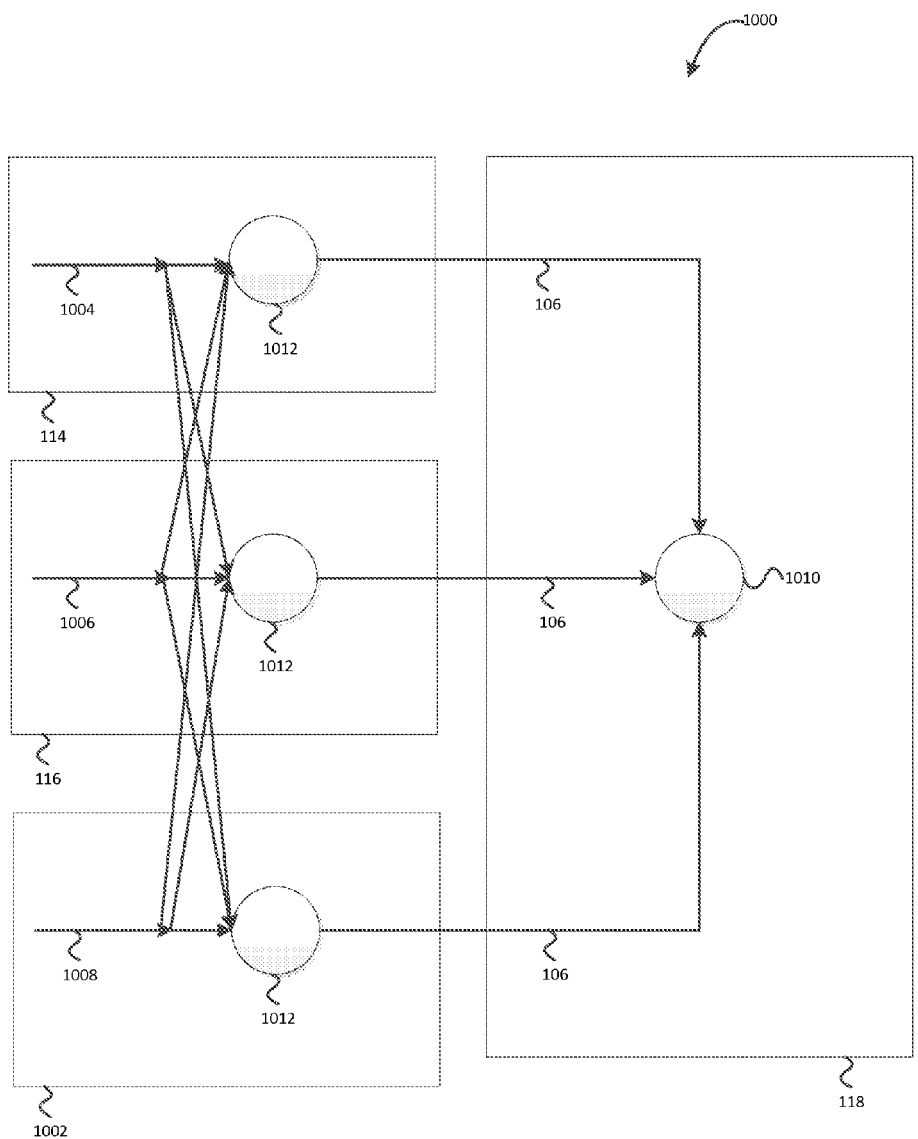
FIG. 10 illustrates an example use of a triple-modular-redundant version of the use of an approximate comparator in a system for maintaining reliability.

FIG. 10 illustrates an example use of a triple-modular-redundant version of the use of an approximate comparator in a system for maintaining reliability. In this embodiment, the system 1000 is a triple modular redundant version involving at least three accelerators 114, 116, 1002 that can protect against hard errors because even if one of the blades fails the computation does not need to be repeated. In this scenario the results 1004, 1006, 1008 generated from each accelerator 114, 116, 1002 are cross linked to each accelerator 114, 116, 1002 where there is a voter 1012, 1014, 1016. The voters 1012, 1014, 1016 on each accelerator 114, 116, 1002 compare the results and selects the answer given by the majority and all the results of the voters 1012, 1014, 1016 are sent to the mainframe server 118 where there is a voter 1010 that compares the results selecting the answer given by the majority of accelerators 114, 116, 1002. This may be used in a long running computation where repeating a computation is not affordable.

In a further embodiment, a system has two physically separate accelerators, or two separate cores on the same accelerator, and a computation generates random numbers for a Monte Carlo simulation, financial engineering, options pricing, or risk analysis. These uses generally require many random numbers to be generated. Programs can generate random numbers using the function time( ) as its seed. It will be understood that time( ) returns the current time. Redundant computations, primary and replica may each run on the physically separate accelerators.

If there are two physically separate accelerators (each running the primary and replica computation) and if the time is different as the input for each random number generator, for example srand( ) different random numbers could be generated. Because in many of these uses of random numbers the equations converge on a single value, for example if the outputs on an equation are averaged, differences might exist in the least significant digits of floating point numbers of the results. Thus, the primary and replica computation may not check by a normal comparator even though the exact same computation was performed by the primary and replica. Even though the result is computed the same way but generate a different final result, it should not be flagged as an error, creating a false positive, when comparing the two floating point values, because the seed to the random number generator was different. The use of an approximate comparator with a sufficiently large $\epsilon$ value can alleviate false positives.

In an alternative embodiment, a workload with compiler assistance could detect computations with physically variable quantities as input (e.g., time, electrical noise, other physical random sources). The compiler could generate code to allow exchange of values between the primary and replica computation. This is not limited to message passing, store and read and shared memory accesses. The workload could exchange input quantities between the primary and replica computation. This would allow the primary and replica computation to emit the same result in absence of a soft error. This method is termed "value lock-stepping". The approximate comparator approach can allow a computation to be run without code changes but with a known bound on possible differences in replica and primary computation results. The "value lock stepping" approach may require a computation to be cognizant of computation redundancy. Hints and tags may be used in the source code to direct a compiler to generate codes to lock-step values. "Value lock stepping" does not require an approximate comparator but a normal comparator would suffice.

False positives can also be generated when you have associative computation with reductions. For example, if you have three values, a, b, and c that a computation is adding together, because of timing of the inputs over a network, one accelerator can compute a+b+c, and then on another accelerator, the values are computed as c+a+b. There is a potential for a mismatch in the results. False positives may also be generated when running a computation redundantly dealing with ill-conditioned matrices.

Figure 3:
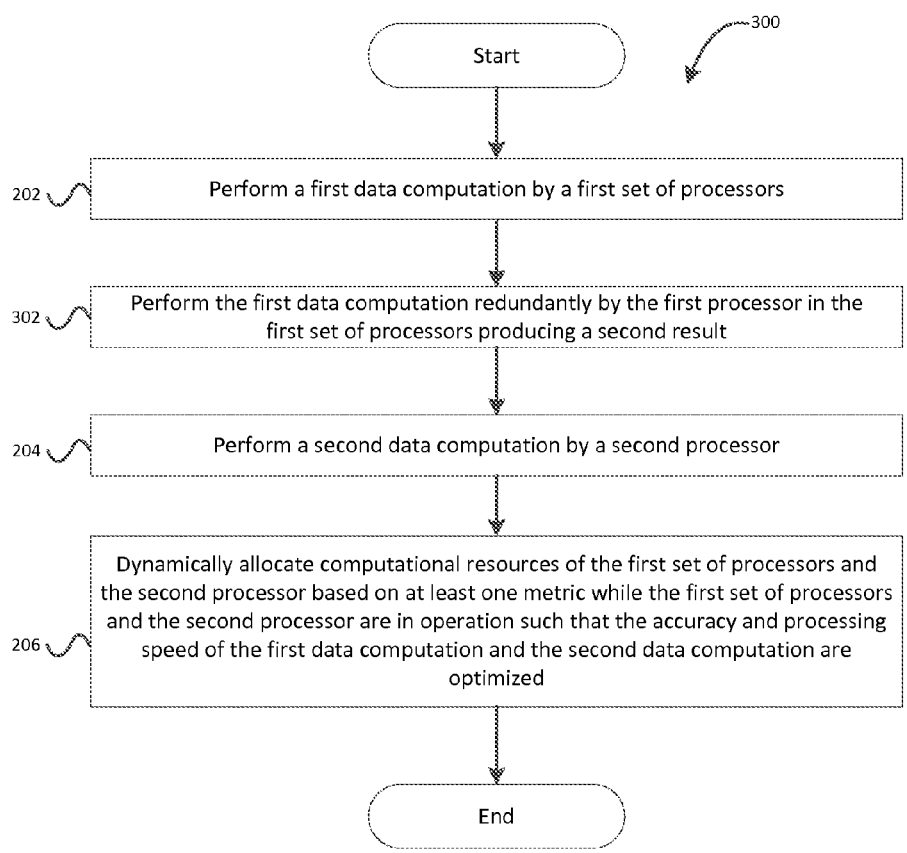
FIG. 3 is a flowchart illustrating time multiplexing within the example method for processing data in a computer system, as contemplated by the present invention.

FIG. 3 is a flowchart illustrating time multiplexing within the example method for processing data in a computer system, as contemplated by the present invention. Time multiplexing, also called the "computation pump", involves performing a computation multiple times on the same processor and then comparing the results generated from each computation. The "computation pump" may be beneficial because accelerators can be run at a high utilization and implementation can be inexpensive while being able to catch soft errors.

As with the flowchart shown in FIG. 2, the method for processing data in a computer system 300 may include performing, at block 202, a first data computation by a first set of processors 102, 120, the first set of processors having a first computer processor architecture 114, 116. Performing the first data computation by a first processor 102 in the first set of processors 102, 120, in block 202, may produce a first result.

At block 302 the method 300 may continue by performing the first data computation redundantly by the first processor 102 in the first set of processors 102, 120 that produces a second result.

The method 300 can continue by performing a second data computation by a second processor 108, at block 204. The second data computation may include comparing the first result and the second result on the second processor 108. The method 300 may further include dynamically allocating computational resources, at block 206, of the first set of processors 102, 120 and the second processor 108.

For example, consider a processor with eight cores. In the redundant instance you can split the processor into two logical processors of four cores each, one called the primary and the other the replica. A computation can then be run on the primary and replica cores simultaneously and then verify the results. For certain computations eight cores may be needed so the computation could be run on all eight cores, a primary run, store the operation, and then run the computation on the cores again, the replica run.

Figure 4:
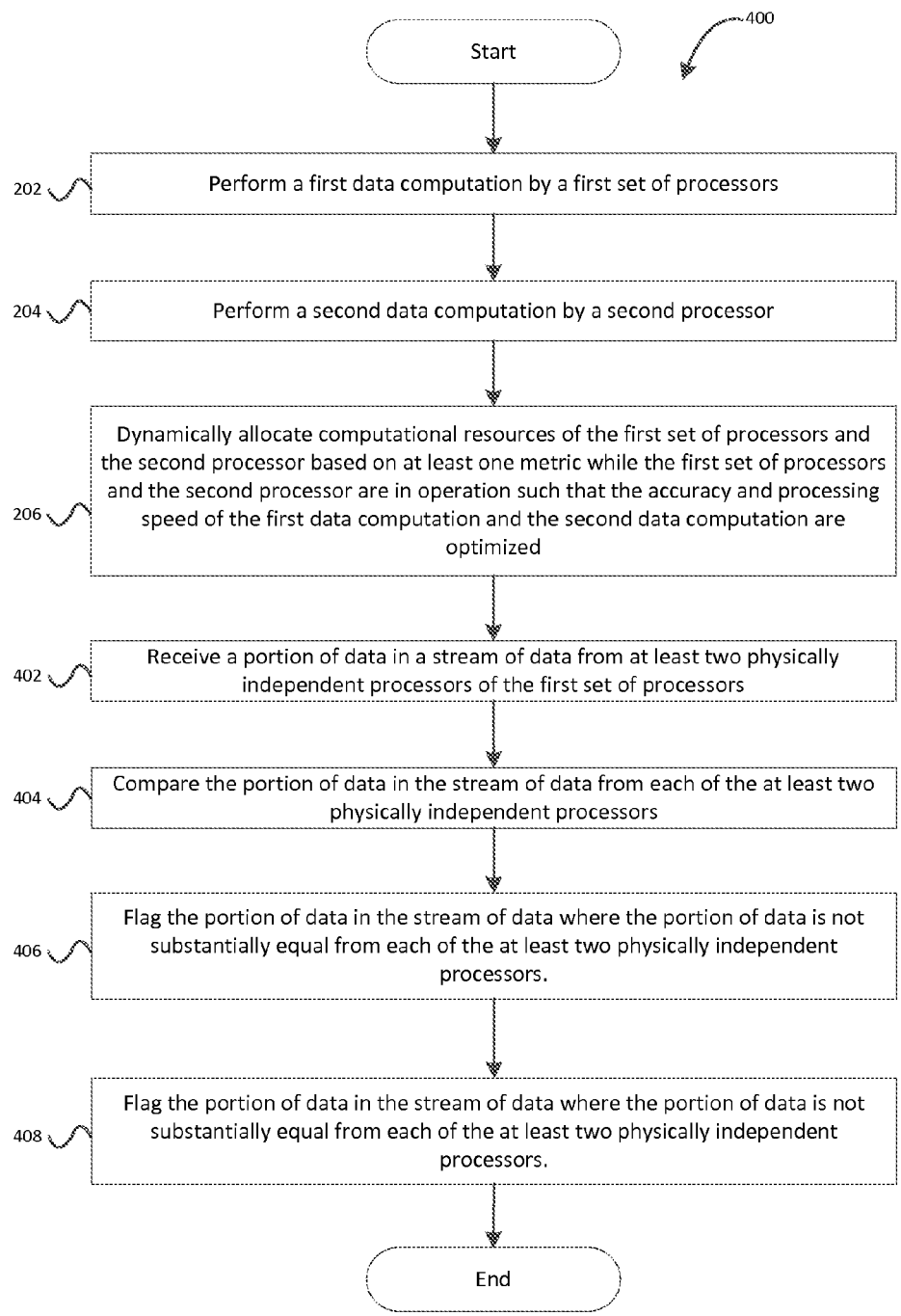
FIG. 4 is a flowchart illustrating checksum mismatch checking within the example method for processing data in a computer system, as contemplated by the present invention.

FIG. 4 is a flowchart illustrating checksum mismatch checking within the example method for processing data in a computer system, as contemplated by the present invention.

As with the flowchart of FIG. 2, the method for processing data in a computer system 400 may include performing, at block 202, a first data computation by a first set of processors 102, 120, the first set of processors 102, 120 having a first computer processor architecture 114, 116. The method 400 may continue by performing a second data computation by a second processor 108, at block 204. The method 400 may further include dynamically allocating computational resources, at block 206, of the first set of processors 102, 120 and the second processor 108.

Embodiments of the invention may also include, at block 402, receiving a portion of data in a stream of data from at least two physically independent processors of the first set of processors 102, 120. The method 400 may also include comparing the portion of data in the stream of data from each of the at least two physically independent processors 102, 120, at block 404. The method 400 may also incorporate flagging, at block 406, the portion of data in the stream of data where the portion of data is not substantially equal from each of the at least two physically independent processors 102, 120.

In a further embodiment of the invention, the method 400 may include requesting at least one of the at least two physically independent processors 102, 120 to asynchronously resend the portion of data that was flagged, at block 408.

Figure 5:
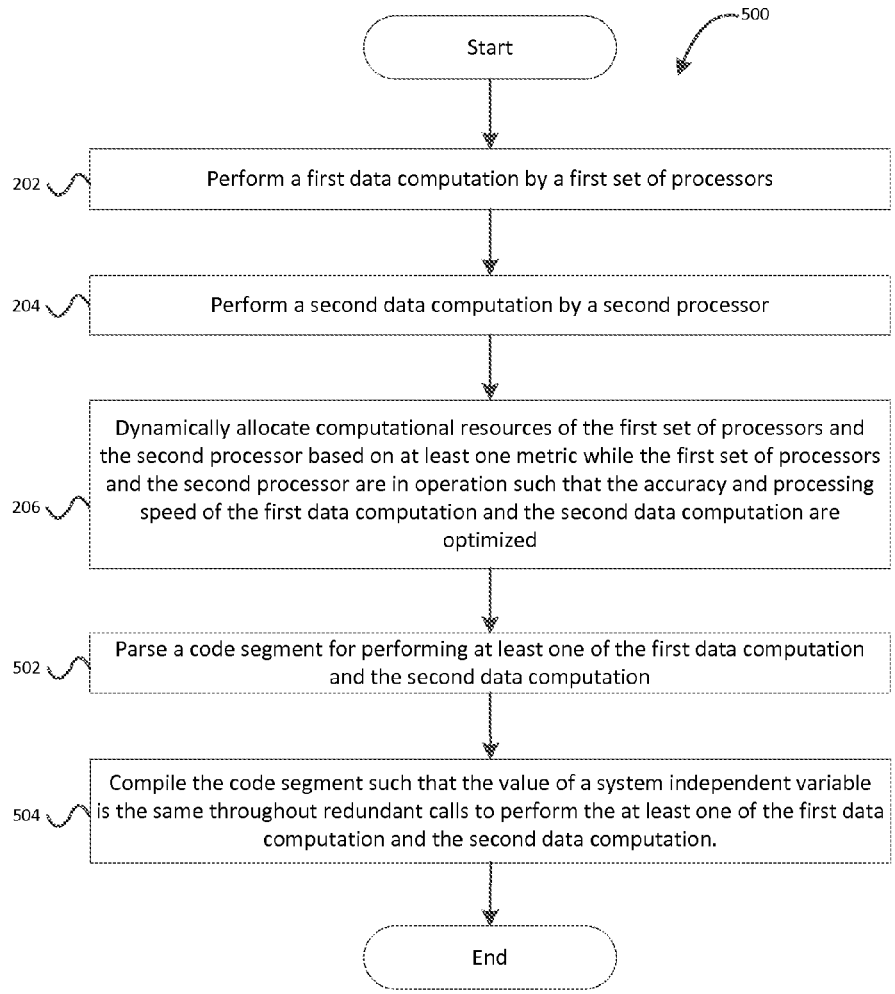
FIG. 5 is a flowchart illustrating value sharing within the example method for processing data in a computer system, as contemplated by the present invention.

FIG. 5 is a flowchart illustrating value sharing within the example method for processing data in a computer system, as contemplated by the present invention.

As with the flowchart in FIG. 2, the method for processing data in a computer system 500 may include performing, at block 202, a first data computation by a first set of processors 102, 120, the first set of processors 102, 120 having a first computer processor architecture 114, 116. The method 500 may continue by performing a second data computation by a second processor 108, at block 204. The method 500 may further include dynamically allocating computational resources, at block 206, of the first set of processors 102, 120 and the second processor 108.

Embodiments of the invention also include parsing a code segment for performing at least one of the first data computation and the second data computation, at block 502. The method 500 may also involve compiling, at block 504, the code segment such that the value of a system independent variable is the same throughout redundant calls to perform the at least one of the first data computation and the second data computation. The system independent value, that the primary and replica computations synchronize on, may be a value dependent on current time or based on quantities in the physical environment such as thermal or electrical noise, as was described previously.

For example, if there are two physically distinct accelerators 114, 116 both using the function time as an input to a random number generator, and one of the accelerators 114 generates a random number and exchanges that with the other accelerator 116. The approximate comparator can be avoided by enforcing computations in the code through the compiler technique, and then redundancy may be checked using regular comparators.

Figure 6:
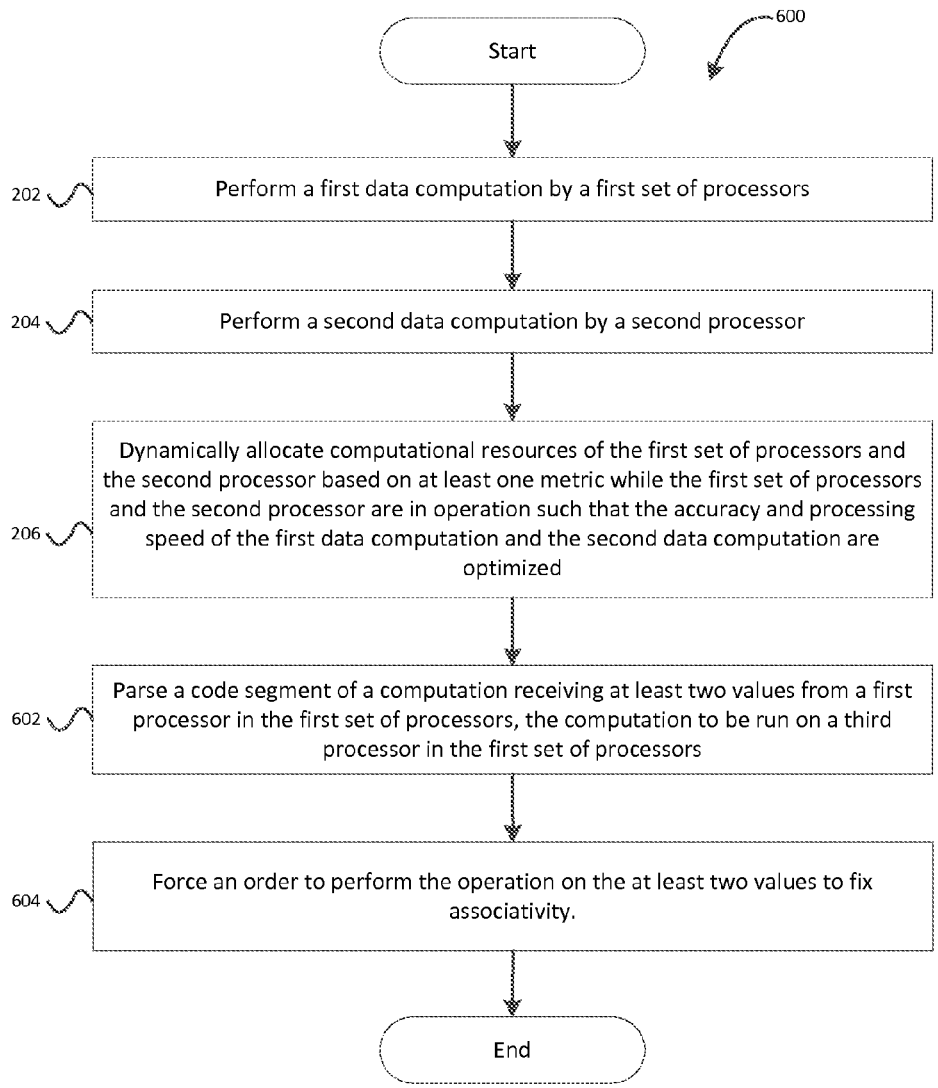
FIG. 6 is a flowchart illustrating a compiler technique to fix associativity issues within the example method for processing data in a computer system, as contemplated by the present invention.

FIG. 6 is a flowchart illustrating a compiler technique to fix associativity issues within the example method for processing data in a computer system, as contemplated by the present invention.

As with the flowchart of FIG. 2, the method for processing data in a computer system 600 may include performing, at block 202, a first data computation by a first set of processors 102, 120, the first set of processors 102, 120 having a first computer processor architecture 114, 116. The method 600 may continue by performing a second data computation by a second processor 108, at block 204. The method 600 may further include dynamically allocating computational resources, at block 206, of the first set of processors 102, 120 and the second processor 108.

Embodiments of the invention may also include parsing a code segment of a computation receiving at least two values from a first processor 102 in the first set of processors 102, 120, the computation to be run on a third processor 120 in the first set of processors 102, 120, at block 602. The method 600 may also include forcing an order, at block 604, to perform the operation on the at least two values to fix associativity.

For example, a program may have a loop that communicates with three different processes. The program could be coded to add the three values as they come in from the three processes but this could create associativity issues when checked redundantly. A different technique could be to enforce an order within the code to get around the associativity issue, particularly when the accelerators are homogeneous.

Figure 7:
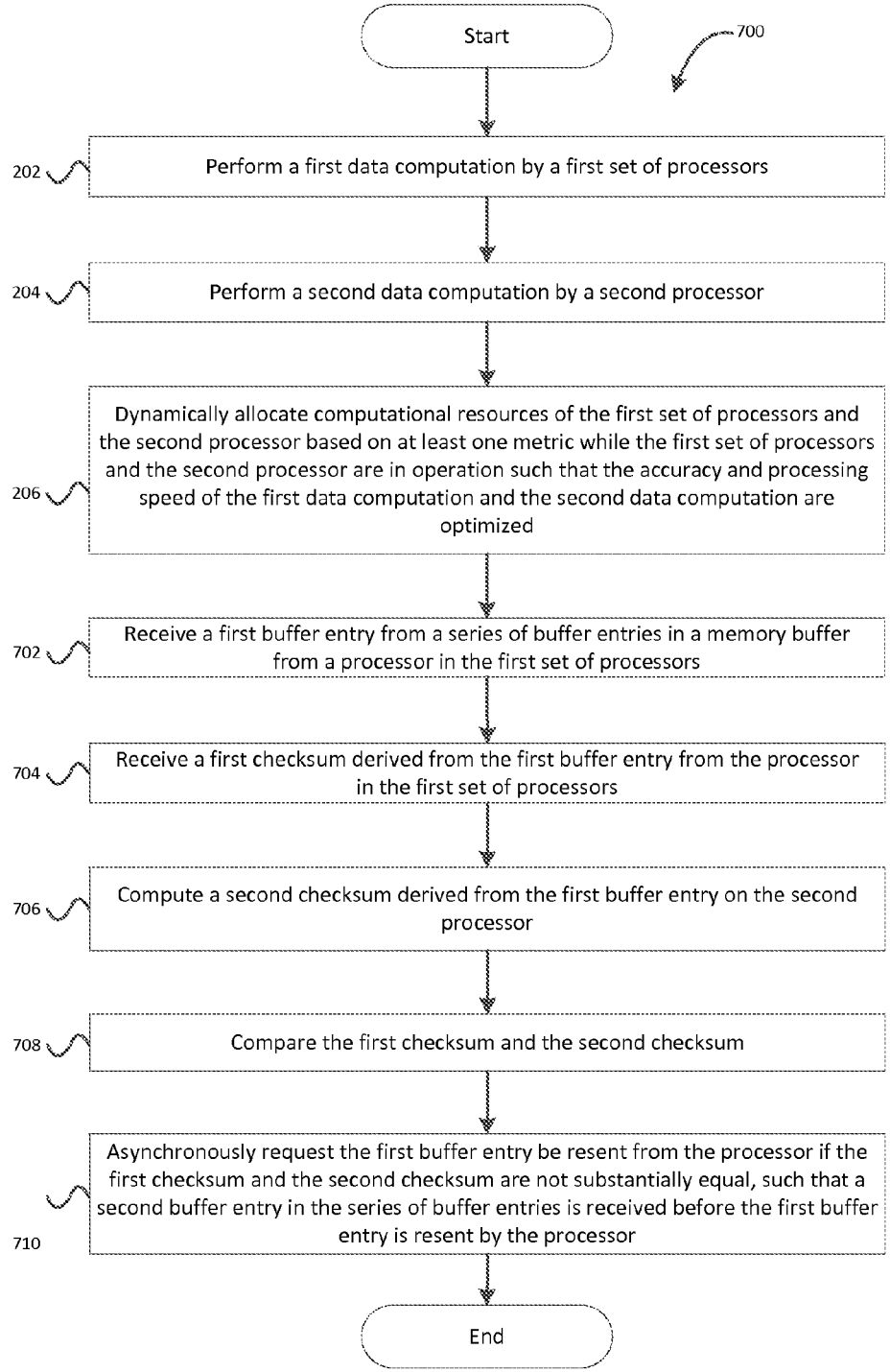
FIG. 7 is a flowchart illustrating out of phase checking within the example method for processing data in a computer system, as contemplated by the present invention.

FIG. 7 is a flowchart illustrating out of phase checking within the example method for processing data in a computer system, as contemplated by the present invention.

As with the flowchart of FIG. 2, the method for processing data in a computer system 700 may include performing, at block 202, a first data computation by a first set of processors 102, 120, the first set of processors having a first computer processor architecture 114, 116. The method 700 may continue by performing a second data computation by a second processor 108, at block 204. The method 700 may further include dynamically allocating computational resources, at block 206, of the first set of processors 102, 120 and the second processor 108.

Embodiments of the invention may also include receiving a first buffer entry from a series of buffer entries in a memory buffer from a processor 102 in the first set of processors 102, 120, at block 702. At block 704, the method of processing data 700 may include receiving a first checksum derived from the first buffer entry from the processor 102 in the first set of processors 102, 120. The method 700 may further include computing, at block 706, a second checksum derived from the first buffer entry on the second processor 108. The method 700 may incorporate comparing the first checksum and the second checksum, at block 708. The method 700 may include asynchronously requesting, at block 710, the first buffer entry be resent from the processor 102 if the first checksum and the second checksum are not substantially equal, such that a second buffer entry in the series of buffer entries is received before the first buffer entry is resent by the processor.

Figure 8:
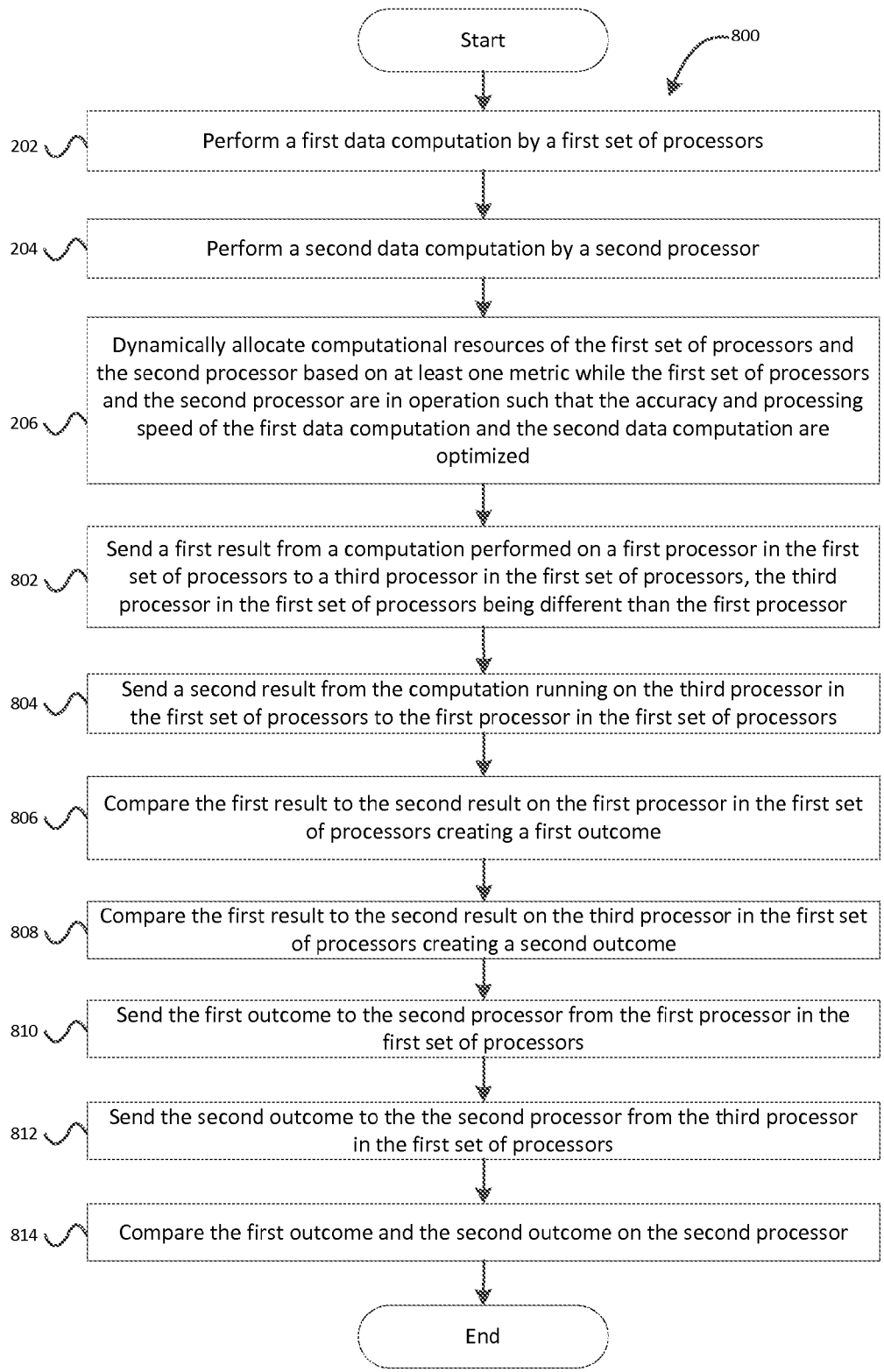
FIG. 8 is a flowchart illustrating multi-stage network checking within the example method for processing data in a computer system, as contemplated by the present invention.

FIG. 8 is a flowchart illustrating multi-stage network checking within the example method for processing data in a computer system, as contemplated by the present invention.

As with the flowchart of FIG. 2, the method for processing data in a computer system 800 may include performing, at block 202, a first data computation by a first set of processors 102, 120, the first set of processors 102, 120 having a first computer processor architecture 114, 116. The method 800 may continue by performing a second data computation by a second processor 108, at block 204. The method 800 may further include dynamically allocating computational resources, at block 206, of the first set of processors 102, 120 and the second processor 108.

Embodiments of the invention may also include sending, at block 802, a first result from a computation performed on a first processor 102 in the first set of processors 102, 120 to a third processor 120 in the first set of processors 102, 120, the third processor 120 in the first set of processors 102, 120 being different than the first processor 102. At block 804, the method for processing data 800 may include sending a second result from the computation running on the third processor 120 in the first set of processors 102, 120 to the first processor 102 in the first set of processors 102, 120. The method 800 may include comparing, at block 806, the first result to the second result on the first processor 102 in the first set of processors 102, 120 creating a first outcome. The method 800 may further include comparing the first result to the second result on the third processor 120 in the first set of processors 102, 120 creating a second outcome, at block 808. At block 810, the method for processing data 800 may include sending the first outcome to the second processor 108 from the first processor 102 in the first set of processors 102, 120. The method 800 may include sending, at block 812, the second outcome to the second processor 108 from the third processor 120 in the first set of processors 102, 120. At block 814, the method 800 may incorporate comparing the first outcome and the second outcome on the second processor 108.

For example, data is being transferred from an accelerator 114 to the mainframe server 118 and there is a checksum mismatch. The checksum mismatch may be due to a bit flip, a soft error in the network adapter, or a problem in the transfer on the network 106. While the mainframe server 118 could ask the accelerator to resend the data synchronously it may be optimal to use out of phase checking. In a stateless computation or one with multiple independent inputs, parts of data that had mismatched checksums are flagged and the others continue in their computation. Then, asynchronously, go back and have the mismatched data get resent.

Figure 11:
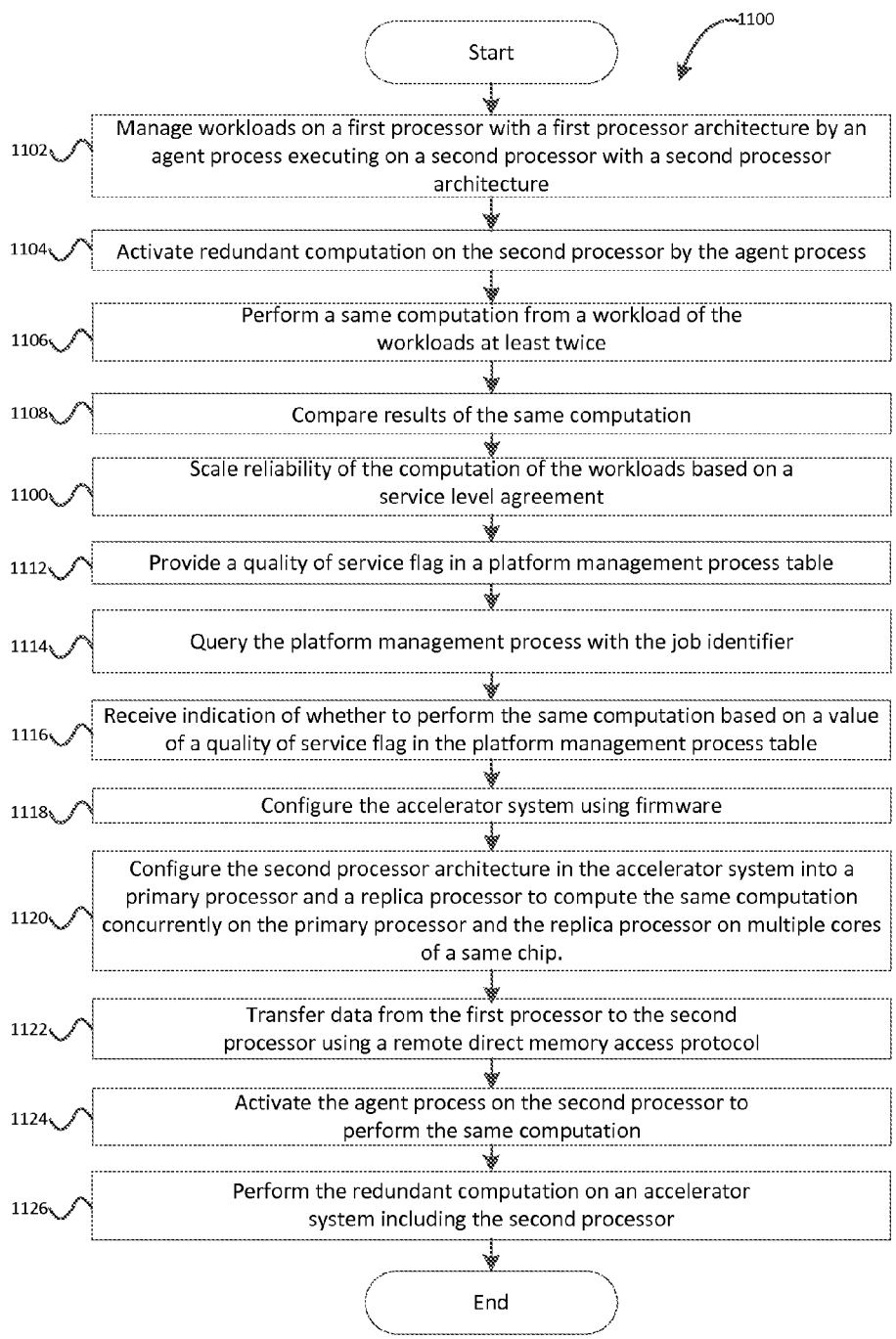
FIG. 11 is a flowchart illustrating an example method for processing data in a computer system, as contemplated by the present invention.

FIG. 11 is a flowchart illustrating a method for processing data in a computer system, as contemplated by the present invention. At block 1102, the method 1100 may include managing workloads on a first processor with a first processor architecture by an agent process executing on a second processor with a second processor architecture. At block 1104, the method 1100 may include activating redundant computation on the second processor by the agent process. At block 1106, the method 1100 may include performing the same computation from a workload at least twice. At block 1108, the method 1100 may include comparing results of the same computation. The first processor is coupled to the second processor by a network. The first processor architecture and second processor architecture may be different architectures. Redundant computation is performing a computation at least twice and comparing results of the computation. In an embodiment of the invention, managing the workloads on the first processor, at block 1102, uses an Open Computing Language (OpenCL) runtime system.

The method 1100 may continue, at block 1110, by scaling reliability of the computation of the workloads based on a service level agreement. The service level agreement may specify one of multiple grades of reliability.

At block 1112, the method 1100 may continue by providing a quality of service flag in a platform management process table, where a platform management process is associated with the platform management process table such that the platform management process can monitor and manage resources and performance for the first processor and the second processor. In an embodiment of the present invention, the platform management process table includes a job identifier identifying a workload to be performed on the second processor. In a further embodiment, the platform management process table includes a redundancy definition field to configure hardware requirements for a workload.

The method 1100 may include, at block 1114, querying the platform management process with the job identifier. At block 1116, the method may continue by receiving indication of whether to perform the same computation based on a value of a quality of service flag in the platform management process table.

The method 1100 may further include, at block 1118, configuring the accelerator system using firmware.

At block 1120, the method 1100 may also include configuring the second processor architecture in the accelerator system into a primary processor and a replica processor to compute the same computation concurrently on the primary processor and the replica processor on multiple cores of a same chip.

At block 1122, the method 1100 may include transferring data from the first processor to the second processor using a remote direct memory access protocol. The method 1100 may continue, at block 1124, by activating the agent process on the second processor to perform the same computation. At block 1126, the method 1100 may further include performing the same computation on an accelerator system including the second processor.

Figure 12:
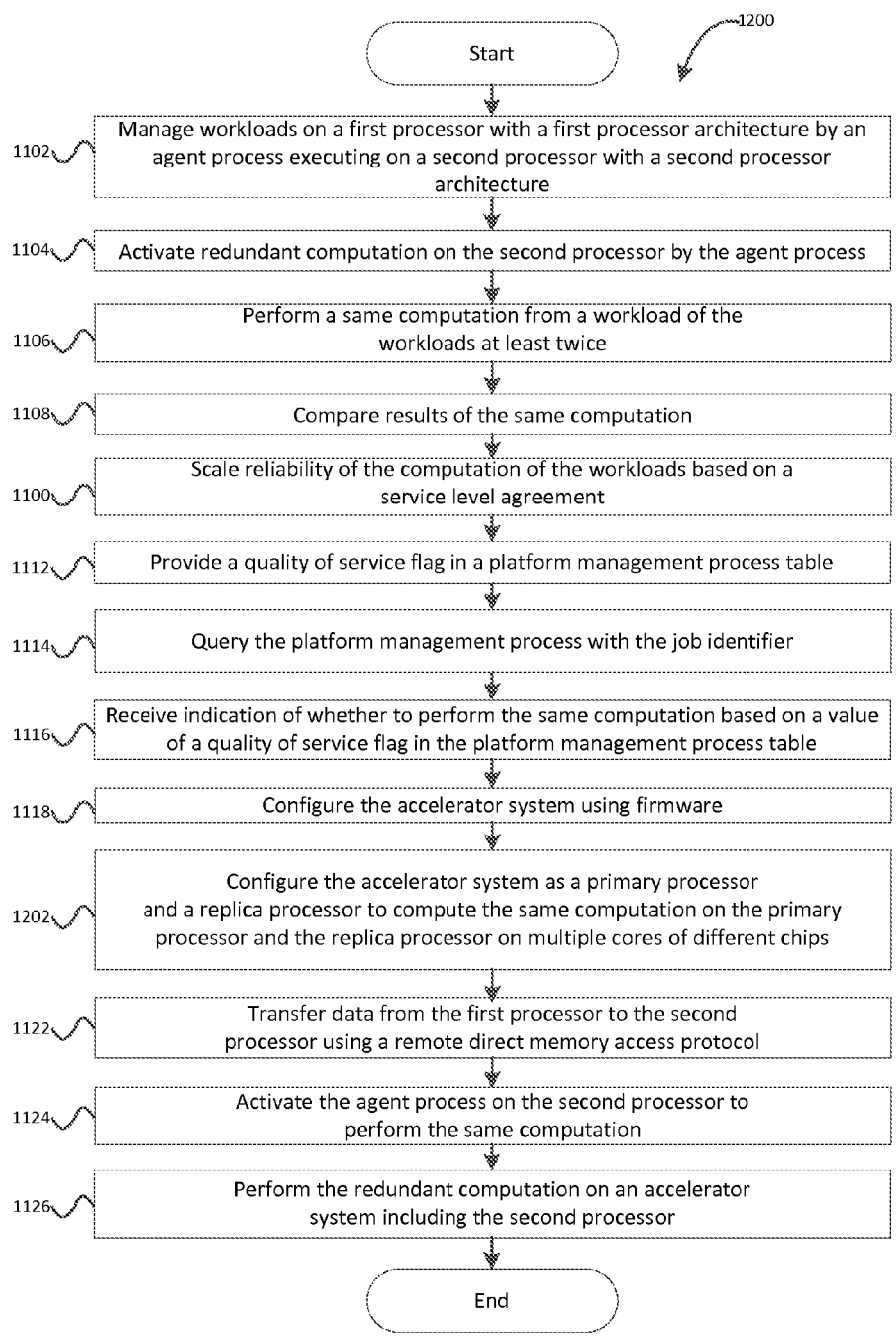
FIG. 12 is another flowchart illustrating an example method for processing data in a computer system, as contemplated by the present invention.

FIG. 12 is another flowchart illustrating a method for processing data in a computer system, as contemplated by the present invention. The method 1200 is similar to the method 1100 in FIG. 11, replacing block 1120 with block 1202. The method 1200, at block 1202, may include configuring the accelerator system as a primary processor and a replica processor to compute the same computation concurrently on the primary processor and the replica processor on multiple cores of different chips.

Figure 13:
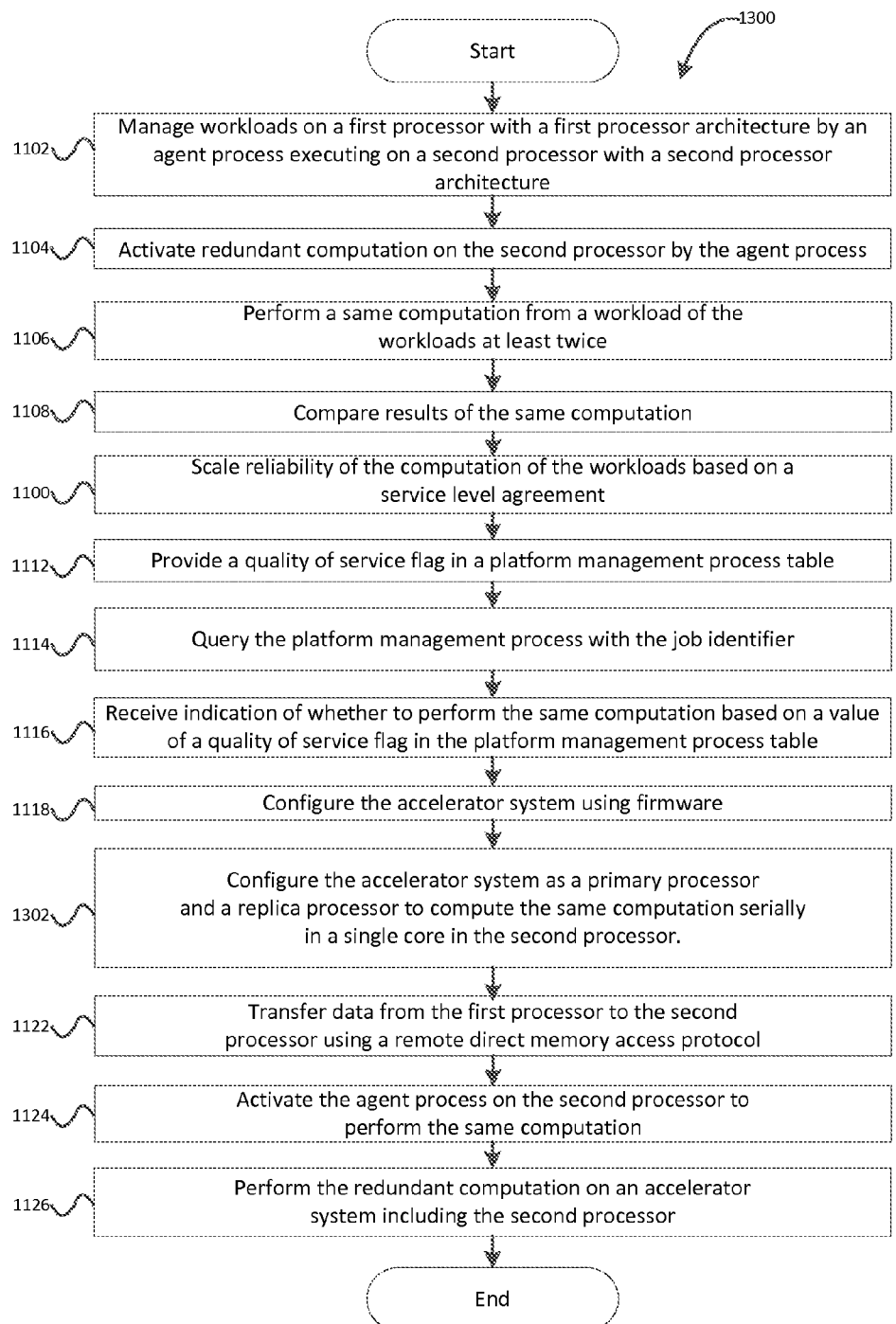
FIG. 13 is another flowchart illustrating an example method for processing data in a computer system, as contemplated by the present invention.

FIG. 13 is another flowchart illustrating a method for processing data in a computer system, as contemplated by the present invention. The method 1300 is similar to the method 1100 in FIG. 11, replacing block 1120 with block 1302. The method 1300, at block 1302, may include configuring the accelerator system as a primary processor and a replica processor to compute the same computation serially in a single set of one or more cores in the second processor (please change corresponding Figure also).

Figure 14:
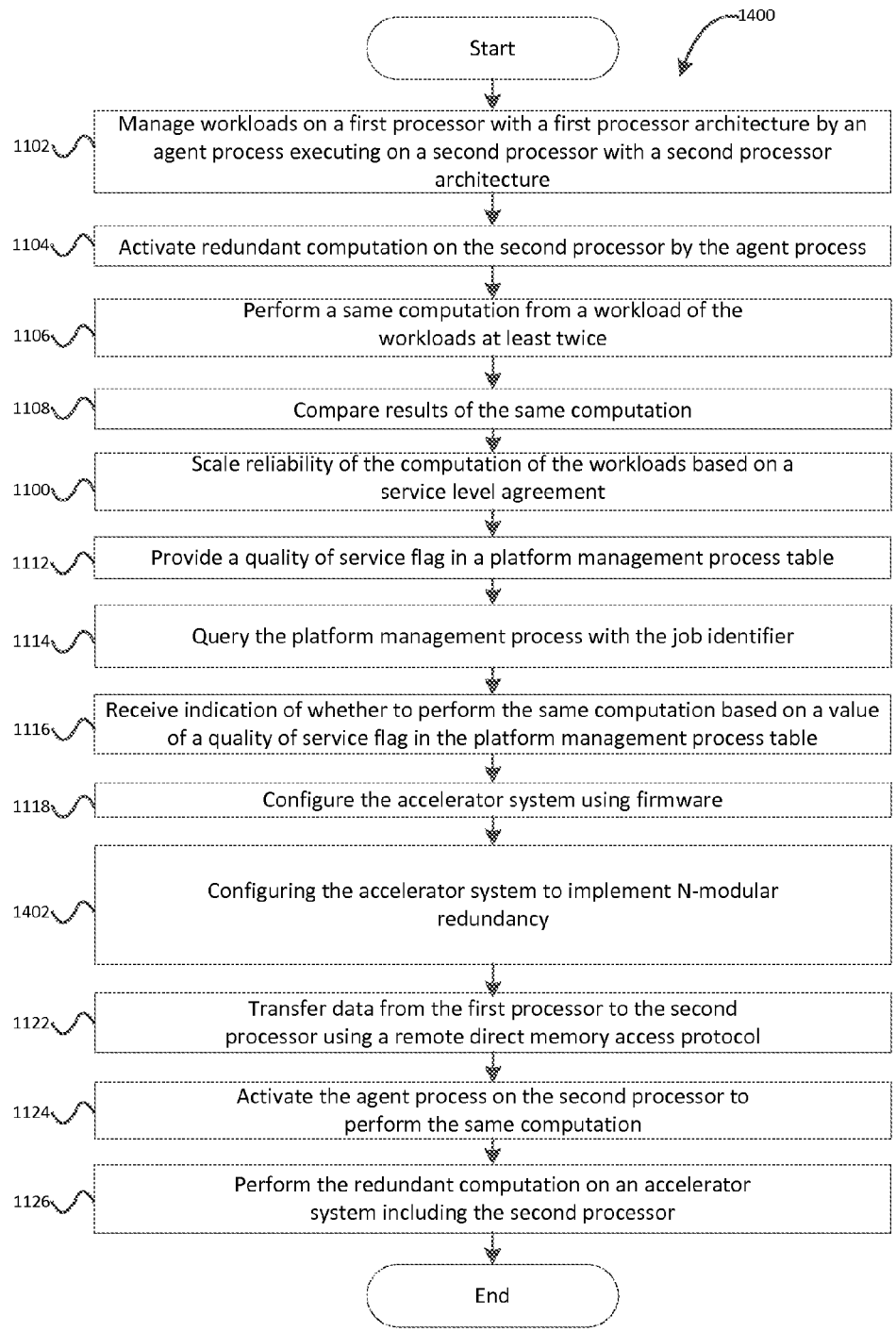
FIG. 14 is another flowchart illustrating an example method for processing data in a computer system, as contemplated by the present invention.

FIG. 14 is another flowchart illustrating a method for processing data in a computer system, as contemplated by the present invention. The method 1400 is similar to the method 1100 in FIG. 11, replacing block 1120 with block 1402. The method 1400, at block 1402, may include configuring the accelerator system to implement N-modular redundancy. The accelerator system may include at least two processors in addition to the second processor.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as OpenCL, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described.

The invention claimed is:

1. A system comprising:
a first processor;
a first memory coupled to the first processor;
a network link coupled to the first processor;
a second processor coupled to the first processor through the network link;
a second memory coupled to the second processor, the second memory having computer readable program code embodied therewith, the computer readable program code configured to:
set a flag for redundancy checking of a computation in the second memory, where the redundancy checking performs the computation at least twice and compares results of each computation; and
command an agent process executing on the first processor to perform redundancy checking when running the computation on the first processor based on a state of the flag.

2. The system of claim 1, wherein the flag is set dynamically based on policy information.

3. The system of claim 1, further comprising:
wherein the network link comprises a data path and a control path; and
wherein the computer readable program code is further configured to compute a first checksum by the first processor based on data received on the data path and compare the checksum with a second checksum computed by the second processor, received on the control path.

4. A computer program product for maintaining reliability in a computer system configuration, the computer program product comprising:
a non-transitory computer readable storage media having computer readable program code embodied therewith, the computer readable program code configured to:
manage workloads on a first processor with a first processor architecture by an agent process executing on a second processor with a second processor architecture;
activate redundant computation on the second processor by the agent process;
perform a same computation from a workload of the workloads at least twice;
compare results of the same computation;
provide a quality of service flag in a platform management process table, where a platform management process is associated with the platform management process table such that the platform management process can monitor and manage resources and performance for the first processor and the second processor;
wherein the first processor is coupled to the second processor by a network, and the first processor architecture and second processor architecture are different architectures.

5. The computer program product of claim 4, where managing the workloads on the first processor includes using an Open Computing Language runtime system.

6. The computer program product of claim 4, where the platform management process table includes a job identifier identifying a workload to be performed on the second processor.

7. The computer program product of claim 6, further comprising program code configured to query the platform management process with the job identifier.

8. The computer program product of claim 4, wherein the platform management process table includes a redundancy definition field to configure hardware requirements for a workload.

9. The computer program product of claim 4, further comprising program code configured to receive indication of whether to perform the same computation based on a value of a quality of service flag in the platform management process table.

10. The computer program product of claim 9, further comprising program code configured to activate the agent process on the second processor to perform the same computation.

11. The computer program product of claim 10, further comprising program code configured to perform the same computation on an accelerator system including the second processor.

12. The computer program product of claim 11, further comprising program code to configure the accelerator system using firmware.

13. The computer program product of claim 11, further comprising program code to configure the second processor architecture in the accelerator system into a primary processor and a replica processor to compute the same computation concurrently on the primary processor and the replica processor on multiple cores of a same chip.

14. The computer program product of claim 11, further comprising program code to configure the accelerator system as a primary processor and a replica processor to compute the same computation concurrently on the primary processor and the replica processor on multiple cores of different chips.

15. The computer program product of claim 11, further comprising program code to configure the accelerator system as a primary processor and a replica processor to compute the same computation serially in a single set of single or multiple cores in the second processor.

16. The computer program product of claim 11, further comprising program code to configure the accelerator system to implement N-modular redundancy, the accelerator system further includes at least two processors in addition to the second processor.

17. The computer program product of claim 4, further comprising program code to transfer data from the first processor to the second processor using a remote direct memory access protocol.

18. The computer program product of claim 4, further comprising program code to scale reliability of the computation of the workloads based on a service level agreement, the service level agreement specifying one of multiple grades of reliability.

* * * * *